United States Patent [19]

Fischer

[11] 4,100,951
[45] Jul. 18, 1978

[54] TREE SHEAR-PIVOTED SECONDARY BLADE

[75] Inventor: Robert L. Fischer, New Lenox, Ill.

[73] Assignee: Caterpillar Tractor Co., Peoria, Ill.

[21] Appl. No.: 745,739

[22] Filed: Nov. 29, 1976

[51] Int. Cl.² ............................................. A01G 23/08
[52] U.S. Cl. ............................ 144/309 AC; 30/184; 74/110; 83/600; 144/34 E
[58] Field of Search ............ 144/3 D, 34 R, 34 E, 144/309 AC; 83/589, 590, 600, 649, 698; 74/25, 110; 30/181, 184

[56] References Cited

U.S. PATENT DOCUMENTS

| 3,610,301 | 10/1971 | Jordan | 144/34 E |
| 3,688,816 | 9/1972 | Runeson | 144/309 AC |
| 3,976,111 | 8/1976 | Jonsson | 144/34 E |

Primary Examiner—Othell M. Simpson
Assistant Examiner—W. D. Bray
Attorney, Agent, or Firm—Phillips, Moore, Weissenberger, Lempio and Strabala

[57] ABSTRACT

A tree shear apparatus includes first and second blades, and linkage means interconnecting the blades so that the first blade makes a partial, relatively small cut of the tree and withdrawal from the tree while the second blade cuts through the tree so that the first and second blades together make a complete cut of the body of the tree.

7 Claims, 3 Drawing Figures

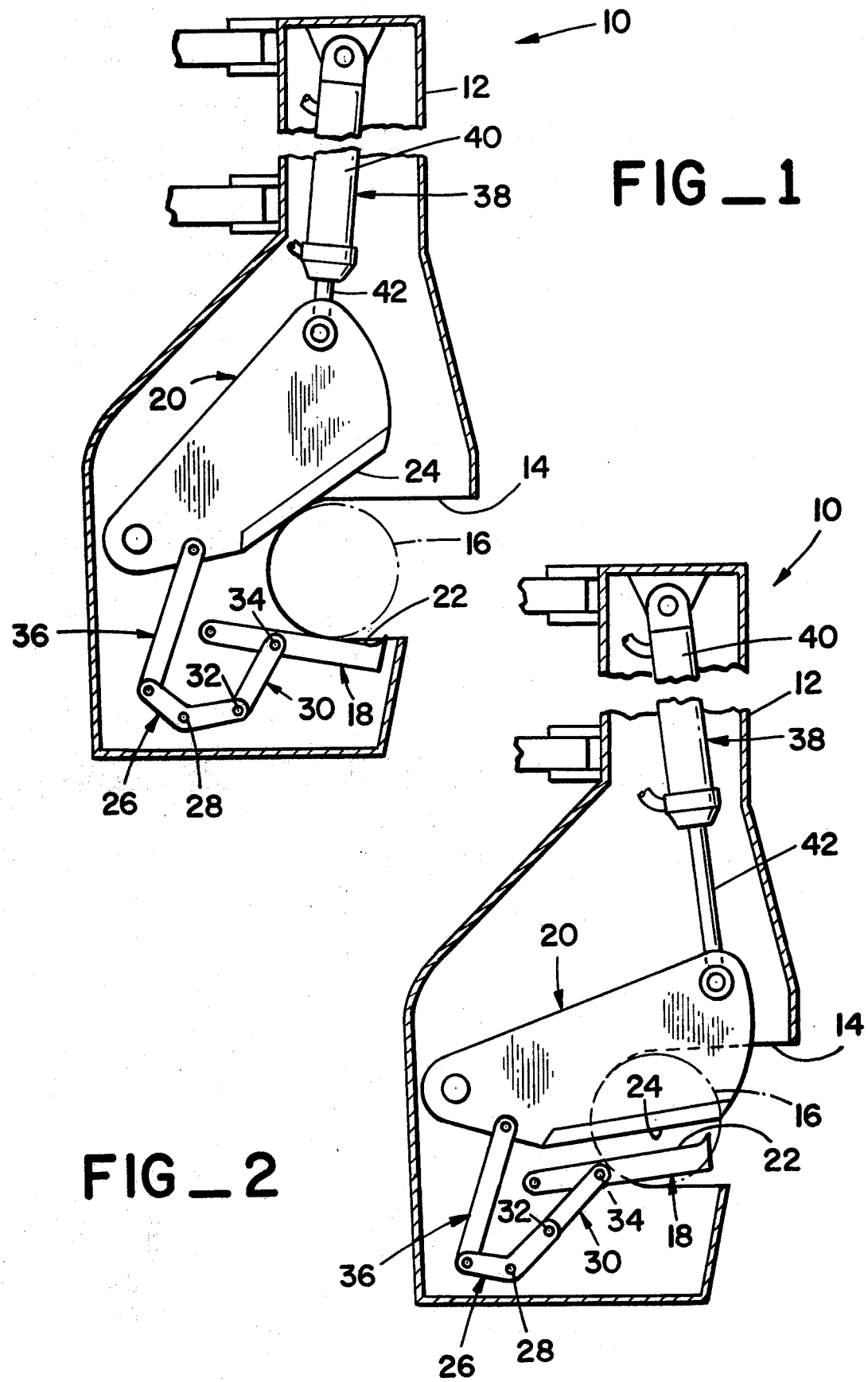

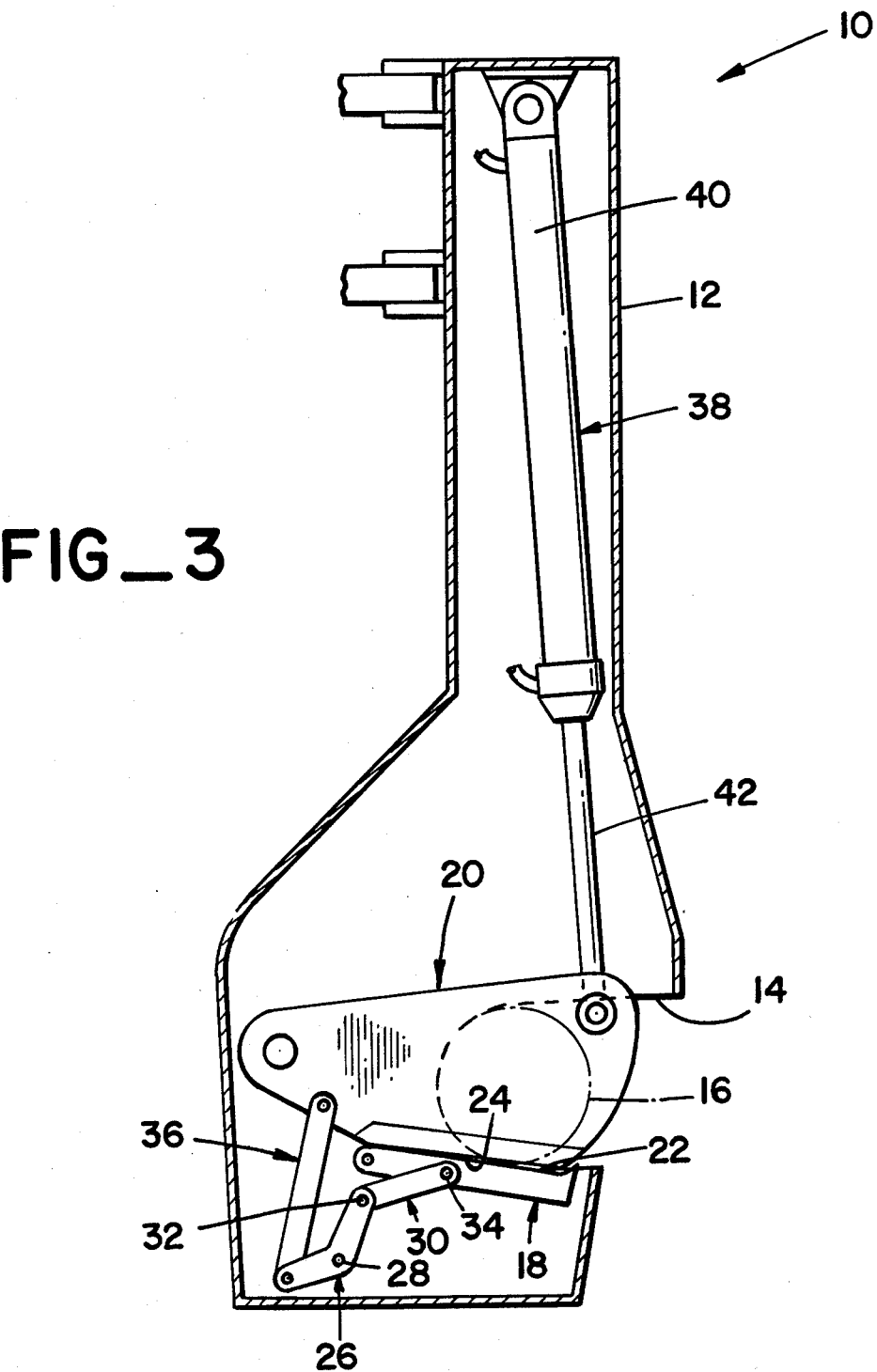
FIG_3

TREE SHEAR-PIVOTED SECONDARY BLADE

BACKGROUND OF THE INVENTION

This invention relates to tree shear apparatus, and more particularly, to a tree shear apparatus which incorporates a pair of blades, one of which cuts a portion of and withdraws from the body of a tree.

In the shearing of a tree by conventional tree-shearing apparatus, it is well known to provide a single blade which cuts entirely through the body of a tree toward an anvil in contact with the tree. While such a tree-shearing apparatus has been found relatively effective in operation, it has been found that a certain amount of tearing and splintering of the tree takes place as the blade approaches the anvil as the cut is almost complete. Such damage is, of course, highly undesirable, resulting in a certain amount of wood which cannot be used for desired purposes.

SUMMARY OF THE INVENTION

It is accordingly an object of this invention to provide tree shear apparatus which provides an efficient cutting of the body of the tree while minimizing splitting of any portion thereof.

It is a further object of this invention to provide tree shear apparatus which, while fulfilling the above object, is extremely simple in design and effective in use.

It is a still further object of this invention to provide a method of shearing the body of a tree which insures that minimal tearing or splintering of the body of the tree takes place.

Broadly stated, the tree-cutting apparatus comprises frame means, a first blade movably mounted relative to the frame means, and a second blade movably mounted relative to the frame means, the body of a tree being positionable between the first and second blades. Means are operatively connected with the blades for moving the first and second blades into and cutting the body of a tree, and for providing at least a partial withdrawal of the first blade upon the first blade having made a partial cut of the body of a tree, and for providing that the second blade continues cutting of the body of a tree subsequent to the cutting action of the first blade.

Broadly stated, the method of cutting the body of a tree comprises moving a first blade into engagement with and through a portion of the body of a tree to define a cut of a given depth, moving a second blade into engagement with and through a portion of the body of the tree to define a cut, the first blade being withdrawn so that the cut of the second blade provides, along with the cut of the first blade, a full cut of the body of a tree.

BRIEF DESCRIPTION OF THE DRAWINGS

These and other objects of the invention will become apparent from a study of the following specification and drawings, in which:

FIG. 1 is a plan view, with portions removed, of the tree shear apparatus embodying the invention, wherein the blades are in their open positions;

FIG. 2 is a view similar to that shown in FIG. 1, but with the blades in an intermediate position; and FIG. 3 is a view similar to that shown in FIG. 1 and FIG. 2, but with the body of the tree being fully cut therethrough.

DESCRIPTION OF THE PREFERRED EMBODIMENTS

Shown in FIGS. 1, 2 and 3 is the shear apparatus 10, which may be fitted to the front portion of a vehicle as is well known, such front portion including, for example, grapple arms, to grip the body or trunk of the tree as the shearing is taking place.

As shown in FIGS. 1-3, the shear apparatus 10 includes a frame 12 which in turn includes a generally U-shaped recess 14, the frame 12 being positionable so that the body 16 of a tree may seat within the recess 14. A first blade 18 is pivotally mounted relative to the frame 12 on one side of the recess 14, and a second blade 20 is pivotally mounted to the frame 12 on the other side of the recess 14. The blades 18,20 have cutting edges 22,24 as shown. A bell-crank 26 has its mid portion pivotally connected to the frame 12 at 28. A first link 30 has one end pivotally connected to one end of the bell-crank 26 at 32., and the other end pivotally connected to the blade 18 at 34. A second link 36 has one end pivotally connected to the other end of the bell-crank 26, and the other end of the link 36 is pivotally connected to the blade 20. A hydraulic cylinder 38 has its head end 40 pivotally connected to the frame 12, and its rod end 42 pivotally connected to the blade 20.

In the use of the apparatus, the vehicle is moved so that the body 16 of a tree is positioned in the recess 14, with the cylinder 38 fully retracted as shown in FIG. 1, so that the body 16 of the tree is positioned between the blades 18,20. Extension of the cylinder 38 pivots the blade 20 to move the edge 24 into engagement with the body 16, further extension of the cylinder 38 causing the blade 20 to cut through a portion of the body 16 of the tree. During such time, the link 36 is being moved through movement of the blade 20 to pivot the bell-crank 26 in a counterclockwise direction. Such movement of the bell-crank 26 moves the pivotal connection 32 of the bell-crank 26 and first link 30 from one side to the other of a straight line connection (i) the pivotal connection 28 of the bell-crank 26 and frame 12 and (ii) the pivotal connection 34 of the first link 30 and blade 18. That is, counterclockwise movement of the bell-crank 26 provides that the blade 18 is moved into engagement with and through a portion of the body 16 of the tree to define a partial cut of the body 16 of the tree of a given depth, determined by the pivots 28,32,34 falling along a straight line (FIG. 2). Further counterclockwise movement of the bell-crank 26 provides withdrawal of the blade 18 from the body 16 of the tree.

As set forth above, such counterclockwise pivoting of the bell-crank 16 is provided by continued extension of the cylinder 38, which is also moving the blade 20 through a portion of the body 16 of the tree to define a cut, the blades 18,20 actually making their initial cuts simultaneously.

As the blade 18 is being withdrawn, the cutting action of the blade 20 continues, the blades 18,20 being in the same plane so that as the cut of the blade 20 reaches the cut of the blade 18, from which the blade 18 has already withdrawn, a complete cut is provided through the body 16 of the tree.

The movement of the blade 18 is chosen to provide that the partial cut thereby is substantially less than a full cut of the body 16 of the tree. For example, if the body 16 of the tree is of the order of 18 inches in diameter, the full depth of cut of the blade 18 may be with advantage, from 2 to 4 inches.

I claim:

1. Tree cutting apparatus comprising:

frame means;

a first blade movably mounted relative to the frame means;

a second blade movably mounted relative to the frame means, the body of a tree being positionable between the first and second blades;

means operatively connected with one of the first and second blades for moving said one of the first and second blades into the body of a tree; and means operatively interconnecting the first and second blades for providing that (i) operation of said means operatively connected with one of the first and second blades to move said one of the first and second blades into and cutting the body of a tree provides movement of the other of first and second blades into and cutting the body of a tree, and for providing (ii) at least a partial withdrawal of the other of the first and second blades upon the one of the first and second blades having made a partial cut of the body of a tree, and for providing that (iii) the one of the first and second blades continues cutting of the body of a tree subsequent to the cutting action of the other blade, wherein the means operatively interconnecting the first and second blades comprise link means;

said link means including a first link means pivotally mounted relative to the frame means, a second link means pivotally connected to the first link means and the first blade, and a third link means pivotally connected to the first link means and the second blade.

2. The apparatus of claim 1 wherein the means operatively interconnecting the first and second blades comprise means for providing that the partial cut by the other of the first and second blades is substantially less than a full cut of the body of a tree.

3. The apparatus of claim 2 wherein the means operatively interconnecting the first and second blades comprise means for providing that the cut of the second blade provides, along with the cut of the first blade, a complete cut through the body of a tree.

4. Tree cutting apparatus comprising:

frame means;

a first blade movably mounted relative to the frame means;

a second blade movably mounted relative to the frame means, the body of a tree being positionable between the first and second blades;

means operatively connected with the blades for moving the first and second blades into and cutting the body of a tree, and for providing at least a partial withdrawal of the first blade upon the first blade having made a partial cut of the body of a tree, and for providing that the second blade continues cutting of the body of a tree subsequent to the cutting action of the first blade;

wherein the means operatively connected with the blades comprise a bell-crank pivotally mounted relative to the frame means, a first link pivotally connected to an end of the bell-crank and the first blade, and a second link pivotally connected to the bell-crank and the second blade, the pivotal connection of the bell-crank and first link moving from one side to the other of a straight line connecting (i) the pivotal connection of the bell-crank and frame means and (ii) the pivotal connection of the first link and first blade, to thereby provide cutting by and withdrawal of the first blade.

5. The apparatus of claim 4 wherein the means operatively connected with the blades comprise cylinder means interconnecting the frame means and second blade.

6. A method of cutting the body of a tree comprising:

moving a first blade into engagement with and through a portion of the body of a tree to define a cut of a given depth;

moving a second blade into engagement with and through a portion of the body of a tree to define a cut;

the first blade being withdrawn so that the cut of the second blade provides, along with the cut of the first blade, a full cut of the body of a tree; wherein the step of moving the first blade comprises the step of providing a partial cut of the body of a tree which is substantially less than the full cut thereof, and wherein the initial cutting of the body of a tree by the first and second blades is done simultaneously.

7. A method of cutting the body of a tree comprising;

moving a first blade into engagement with and through a portion of the body of a tree to define a cut of a given depth;

moving a second blade into engagement with and through a portion of the body of a tree to define a cut;

the first blade being withdrawn so that the cut of the second blade provides, along with the cut of the first blade, a full cut of the body of a tree; wherein the initial cutting of the body of a tree by the first and second blades is done simultaneously.

* * * * *